(12) United States Patent
Mersch et al.

(10) Patent No.: US 10,556,538 B2
(45) Date of Patent: Feb. 11, 2020

(54) VEHICLE ROOF ELEMENT

(71) Applicant: Roof Systems Germany GmbH, Dietzenbach (DE)

(72) Inventors: Gerhard Mersch, Uetze (DE); Matthias Ludwig, Schwuelper (DE)

(73) Assignee: ROOF SYSTEMS GERMANY GMBH (DE)

( * ) Notice: Subject to any disclaimer, the term of this patent is extended or adjusted under 35 U.S.C. 154(b) by 0 days.

(21) Appl. No.: 16/193,974

(22) Filed: Nov. 16, 2018

(65) Prior Publication Data

US 2019/0152385 A1 May 23, 2019

(30) Foreign Application Priority Data

Nov. 23, 2017 (DE) .......................... 10 2017 127 746

(51) Int. Cl.
| | |
|---|---|
| *B60Q 3/51* | (2017.01) |
| *B60Q 3/80* | (2017.01) |
| *B60Q 3/74* | (2017.01) |
| *F21V 19/00* | (2006.01) |
| *F21V 23/00* | (2015.01) |
| *F21Y 115/10* | (2016.01) |

(52) U.S. Cl.
CPC .............. *B60Q 3/51* (2017.02); *B60Q 3/74* (2017.02); *B60Q 3/80* (2017.02); *F21V 19/002* (2013.01); *F21V 23/001* (2013.01); *F21Y 2115/10* (2016.08)

(58) Field of Classification Search
CPC ... B60Q 3/51; B60Q 3/74; B60Q 3/80; B60Q 3/208; F21V 19/002; F21V 23/001; F21Y 2115/10; B60J 7/043; B60J 1/00; B60J 1/008
See application file for complete search history.

(56) References Cited

U.S. PATENT DOCUMENTS

| | | | | |
|---|---|---|---|---|
| 9,024,514 | B2 * | 5/2015 | Kato | H05B 33/06 |
| | | | | 257/99 |
| 9,492,575 | B2 * | 11/2016 | Holub | A61L 2/10 |
| 10,202,075 | B2 * | 2/2019 | Lefevre | B32B 17/10 |
| 10,272,833 | B2 * | 4/2019 | Snider | B60Q 3/208 |

(Continued)

FOREIGN PATENT DOCUMENTS

| | | |
|---|---|---|
| DE | 10323234 A1 | 12/2004 |
| DE | 102007039416 A1 | 2/2009 |

(Continued)

OTHER PUBLICATIONS

English Machine Translation to DE 10 2007 039 416 A1, Jan. 11, 2019.

(Continued)

*Primary Examiner* — Peggy A Neils
(74) *Attorney, Agent, or Firm* — Dilworth IP, LLC

(57) ABSTRACT

A vehicle roof element is specified, including a glass pane having an exterior side and an interior side, and a transparent sealing compound which is fastened to the glass pane on the inside, at least one LED and at least one electrical line by means of which the LED is adapted to be contacted being embedded in the sealing compound. The at least one LED and the at least one electrical line are arranged on a flexible foil to which the sealing compound is integrally injection-molded.

10 Claims, 1 Drawing Sheet

(56) References Cited

U.S. PATENT DOCUMENTS

| | | | |
|---|---|---|---|
| 2007/0052120 A1 | 3/2007 | Teschner et al. | |
| 2016/0129945 A1 | 5/2016 | Deppe | |
| 2018/0238513 A1* | 8/2018 | Measel | B32B 17/10036 |
| 2018/0297515 A1* | 10/2018 | Laluet | B32B 17/067 |
| 2019/0134954 A1* | 5/2019 | Bauerle | B60K 37/06 |
| 2019/0184895 A1* | 6/2019 | Oshina | F21V 17/00 |

FOREIGN PATENT DOCUMENTS

| | | |
|---|---|---|
| DE | 202007017630 U1 | 5/2009 |
| DE | 102010038079 A1 | 4/2012 |
| DE | 102013010163 A1 | 12/2014 |
| DE | 102014200606 A1 | 7/2015 |

OTHER PUBLICATIONS

English Machine Translation to DE 10 2010 038 079 A1,; Jan. 11, 2019.

English Machine Translation to DE 10 2014 200 606 A1,; Jan. 11, 2019.

English Machine Translation to DE 20 2007 017 630 U1,; Jan. 11, 2019.

\* cited by examiner

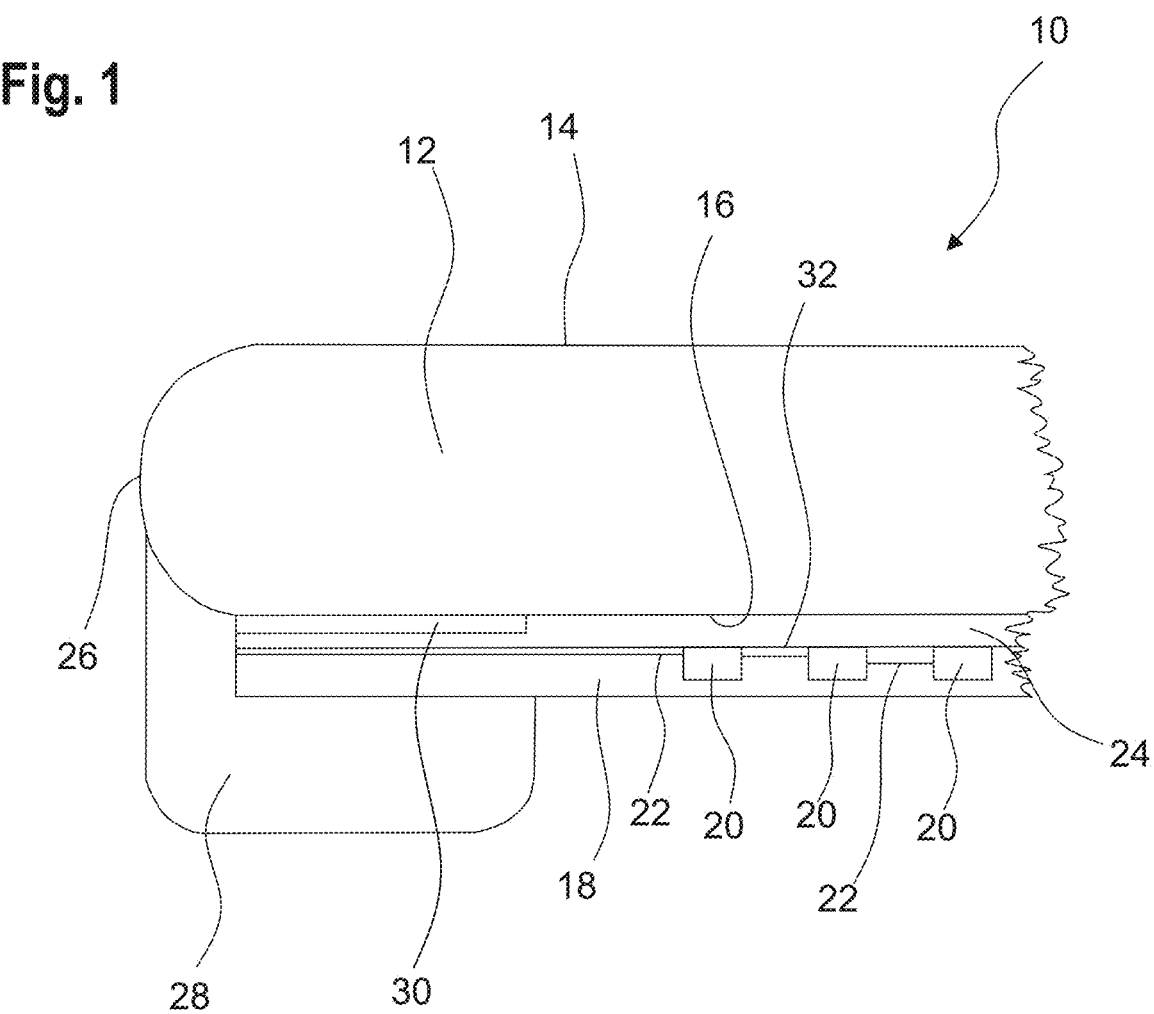

VEHICLE ROOF ELEMENT

CROSS REFERENCE TO RELATED APPLICATIONS

This application claims priority under 35 U.S.C. § 119 to following German Patent application no. 10 2017 127 746.3, filed on Nov. 23, 2017, the entire contents of which are incorporated herein by reference thereto.

FIELD OF THE INVENTION

The present invention relates to a vehicle roof element for a motor vehicle.

BACKGROUND

It is usual to mount lamps in the vehicle interior, for example in the region of a headliner, in particular reading lamps which can be switched on by a vehicle occupant, if required, or which are automatically switched on upon opening of the vehicle door. As in modern motor vehicles large-area glass elements for panoramic roofs are frequently integrated in the vehicle roof, the available installation space for integrating the lamps decreases.

It is known to arrange luminous elements in a vehicle roof between two panes of a laminated safety glass. However, the use of laminated safety glass leads to a high vehicle weight and is furthermore expensive.

It is therefore an object of the present invention to specify a vehicle roof element having an integrated lighting unit which is cost-effective and light.

SUMMARY

The invention provides a vehicle roof element including a glass pane having an exterior side and an interior side, and a transparent sealing compound which is fastened to the glass pane on the inside, at least one LED and at least one electrical line by means of which the LED is adapted to be contacted being embedded in the sealing compound.

By using a glass pane and a sealing compound, the vehicle roof can be configured so as to be considerably lighter than a vehicle roof element having several, in particular two glass panes. The sealing compound is furthermore less expensive than glass. The at least one LED can serve to illuminate the vehicle interior.

The at least one LED and the at least one electric line are arranged on a flexible foil to which the sealing compound is integrally injection-molded. The flexible foil serves as a mounting aid. The at least one LED and the at least one electric line can be prepositioned thereon in that the elements are for example bonded onto the foil. The foil can then be applied onto the glass pane before the sealing compound is fastened to the glass pane, the at least one LED and the at least one electric line being cast into the sealing compound. The foil is preferably made of plastic material or of glass. The foil has for example a thickness of between 0.5 and 1 mm.

The at least one electric line is preferably a micro line. The lines in the vehicle roof element are thus almost invisible to a vehicle occupant.

The at least one LED is for example fitted without any housing. The sealing compound already takes the function of a housing for the LED. This contributes to a compact structure of the vehicle roof element.

Preferably, the glass pane is formed of a single-pane safety glass. Single-pane safety glass has an increased impact and shock resistance in comparison with normal flat glass. Therefore, the glass pane can withstand the charges occurring during vehicle operation, and the necessary safety requirements with respect to the stability of the glass pane can be satisfied. Furthermore, single-pane safety glass is easier to process than laminated safety glass, for example.

The sealing compound preferably includes polyurethane. The sealing compound is transparent and ensures for example a sound insulation and a tint of the glass pane such that it forms a UV and/or IR filter. Furthermore, polyurethane is cost-effective and easy to process. However, other materials, in particular transparent polymer materials are also conceivable.

The sealing compound may have a so-called reflow effect. This reflow effect ensures that the surface is self-closing in case of a scratching therealong with the fingernail or of an impression into the sealing compound, for example. The permanent quality of the vehicle roof element is thus increased, and incidentally, such a material having a self-healing surface is also very well suited as sound-insulating material.

An agglomerate layer comprising agglomerates which are spaced apart from each other and widen at least in sections away from the glass pane can be arranged at least in regions on the glass pane as a binding agent with the sealing compound, the agglomerate layer having an average gap width in the range of 3 to 500 nm due to the spaced apart agglomerates. The average gap width is preferably in the range of 10 to 200 nm, in particular in the range of 20 to 150 nm. The term "agglomerate" is to be interpreted as a conglomeration of smaller particles to a solid compound.

Due to the agglomerate layer, the adhesion between the glass pane and the sealing compound can be improved such that a detachment of the sealing compound from the glass pane is prevented. The agglomerate layer is preferably porous and includes gaps into which the sealing compound can flow. Preferably, the agglomerate layer is a nanostructured layer.

The agglomerate layer is preferably manufactured by a plasma-enhanced chemical vapor deposition (PECVD). The agglomerate layer thus adheres particularly well to the glass pane. Furthermore, the agglomerate layer can thus be manufactured so as to be particularly thin. Such agglomerates that can be manufactured by PECVD can be formed of polymer materials which are obtainable from organic and/or organo-metallic starting compounds or monomers. Suitable monomers are for example hydrocarbons, alcoholates, acetylacetonates or alkyl compounds of suitable metals, siloxanes, silazanes, metal carbonyls or similar compounds. Such polymer materials that can be manufactured by PECVD are also referred to as "plasmapolymers". Suitable inorganic materials are for example oxides, nitrides, oxynitrides, carbids or mixtures of these materials.

According to one embodiment, the glass pane is rounded at is circumferential edges, the agglomerate layer extending up to the rounded region. Due to the rounding, the glass pane is easier to handle, and sharp cutting edges on the glass pane at which a worker could get injured are in particular avoided. The adhesion between the glass pane and the agglomerate layer is additionally improved by the extension of the agglomerate layer up to the rounded region.

According to a preferred embodiment, undercuts are formed in the agglomerate layer by the agglomerates, the sealing compound engaging the undercuts of the agglomerate layer. The sealing compound is thus connected to the agglomerate layer in an almost non detachable manner.

The at least one LED for example directly rests against the agglomerate layer. The vehicle element may thus be particularly compact, in particular thin.

Preferably, the agglomerate layer is transparent. The agglomerate layer does in particular not affect the transparency of the vehicle roof element, such that the atmosphere in the vehicle is not adversely affected for a vehicle occupant.

According to one embodiment, the vehicle roof element has an integrally injection-molded or foamed circumferential frame along the edges of the glass pane. This frame creates the necessary stability for the vehicle roof glass element, wherein further reinforcing parts are usually embedded therein which are made of metal and also permit the coupling of a movable vehicle roof glass element to a drive and the fastening of the vehicle roof glass element to the vehicle roof. The integral injection-molding or foaming to form the frame is usually performed such that the glass pane is placed into a bottom part of an injection-molding or foaming tool and then a cavity is obtained along with the upper part, which is formed around the glass pane and into which the soft plastic material is introduced. Preferably, the frame can and should completely cover the glass pane on its circumferential outwardly oriented lateral face such that the lateral face is nowhere exposed. This means that the frame preferably extends to the front side and is flush therewith.

On the glass pane, in the region of the circumferential frame, an opaque cover layer can be arranged between the glass pane and the agglomerate layer, in particular directly on the glass pane. The cover layer is usually a black print which, on the one hand, improves the adhesion of the material of the frame and, on the other hand, prevents the view onto the foaming or injection-molding material of the frame from the outside, such that a high-quality overall impression is obtained from the outside also in the region of the transition from the transparent part, the viewing region, to the frame.

The cover layer preferably comprises a glass ceramic or a paint coat. Such layers can be applied in a particularly thin and simple manner.

BRIEF DESCRIPTION OF THE DRAWINGS

Further features and advantages of the invention will become apparent from the description below and from the sole drawing below. The drawing shows a vehicle roof element according to the invention in a schematic partial sectional view.

DETAILED DESCRIPTION

The vehicle roof element 10 includes a glass pane 12 having an exterior side 14 and an interior side 16, and a transparent sealing compound 18. The glass pane 12 is for example a single-pane safety glass, while the sealing compound 18 for example comprises polyurethane or is made of polyurethane.

A plurality of LEDs 20 and electric lines 22 for contacting the LEDs 20 is embedded into the sealing compound 18.

To simplify the handling of the LEDs 20 and the lines 22 during mounting, they can be prefixed onto a flexible foil 32. The sealing compound 18 is integrally injection-molded onto the foil 32, i.e. it is attached thereto by the bonding effect between an initial part and the part molded thereon.

A transparent agglomerate layer 24 comprising agglomerates which are spaced apart from each other and widen at least in sections in a direction away from the glass pane is arranged at least in regions on the glass pane 12. Due to the spaced apart agglomerates, the agglomerate layer 24 has an average gap width in the range of 3 to 500 nm. The sealing compound 18 can flow into these gaps which are not represented in the FIGURE due to their small size. A particularly good adhesion between the glass pane 12 and the sealing compound 18 is in this way obtained. Undercuts are in particular formed in the agglomerate layer 24 by the agglomerates, the sealing compound 18 engaging the undercuts of the agglomerate layer 24. The LEDs directly rest against the agglomerate layer 24.

The flexible foil onto which the LEDs 20 and the lines 22 are prefixed can contain recesses in the regions in which no lines 22 and no LEDs 20 are arranged. In the region of the recesses, the transparent sealing compound 18 can come into contact with the agglomerate layer 24 such that the adhesion between the glass pane 12 and the sealing compound 18 is not affected by the flexible foil.

In an alternative embodiment, the flexible foil 32 may be free of recesses.

As the LEDs are arranged merely in a relatively small region of the vehicle roof element 10 and the flexible foil 32 only extends across the region of the glass pane in which the LEDs 20 are also arranged, the adhesion between the glass pane 12 and the sealing compound 18 is sufficiently reliable in spite of the presence of the foil. The LEDs 20 are entirely covered by the sealing compound 18 towards the vehicle interior side.

The glass pane 12 is rounded at its circumferential edges, the agglomerate layer 24 extending at least in regions up to the rounded region. However, in FIG. 1, the region in which the agglomerate layer 24 extends into the rounded region is cut away and thus not visible.

Furthermore, the vehicle roof element 10 has an integrally injection-molded or foamed circumferential frame 28 along the edges 26 of the glass pane 12. In FIG. 1, the frame 28 is essentially arranged on the interior side 16 of the glass pane 12. The frame 28 can however also engage around the edges 26 of the glass pane 12 and extend up to the exterior side 14 of the glass pane 12. The glass pane 12 is thus supported in a particularly stable manner in the frame 28.

In the region of the circumferential frame 28, an opaque cover layer 30 is arranged between the glass pane 12 and the agglomerate layer 24. This cover layer 30 serves as a black print and prevents a view onto the frame 28 from the outside. The cover layer 30 may comprise a glass ceramic or a paint coat.

What is claimed is:

1. A vehicle roof element, including a glass pane having an exterior side and an interior side, and a transparent sealing compound which is fastened to the glass pane on the inside, at least one LED and at least one electrical line embedded in the sealing compound, the electrical line electrically contacting the LED, and the at least one LED and the at least one electrical line being arranged on a flexible foil, the sealing compound being an injection-molded part attached to the flexible foil by injection molding, wherein an agglomerate layer is arranged at least in regions on the glass pane and comprises agglomerates which are spaced apart from each other and are upwardly widened at least in sections, the agglomerate layer having an average gap width in the range of 3 to 500 nm due to the spaced apart agglomerates.

2. The vehicle roof element according to claim 1, wherein the glass pane is formed from a single-pane safety glass.

3. The vehicle roof element according to claim 1, wherein the sealing compound includes polyurethane.

4. The vehicle roof element according to claim 1, wherein the glass pane is rounded at its peripheral edges, the agglomerate layer extending up to the rounded region.

5. The vehicle roof element according to claim 1, wherein undercuts are formed in the agglomerate layer by the agglomerates, the sealing compound engaging the undercuts of the agglomerate layer.

6. The vehicle roof element according to claim 1, wherein the at least one LED directly adjoins or directly rests against the agglomerate layer.

7. The vehicle roof element according to claim 1, wherein the agglomerate layer is transparent.

8. The vehicle roof element according to claim 1, wherein the vehicle roof element has an integrally injection-molded or foamed circumferential frame along the edges of the glass pane.

9. The vehicle roof element according to claim 8, wherein an opaque cover layer is arranged between the glass pane and the agglomerate layer on the glass pane, in the region of the circumferential frame.

10. The vehicle roof element according to claim 9, wherein the cover layer comprises a glass ceramic or a paint coat.

* * * * *